United States Patent [19]

Platte et al.

[11] Patent Number: 5,440,745
[45] Date of Patent: Aug. 8, 1995

[54] BATCH FORMAT PROCESSING OF RECORD DATA

[75] Inventors: Brian G. Platte, Frisco; Jeri L. Sampson; Jamsie R. Treppendahl, both of Boulder; Karen D. Walder, Longmont, all of Colo.

[73] Assignee: International Business Machines Corporation, Armonk, N.Y.

[21] Appl. No.: 54,780

[22] Filed: Apr. 29, 1993

[51] Int. Cl.$^6$ .......................... G06F 9/00; G06F 9/40
[52] U.S. Cl. ............................ 395/700; 364/DIG. 1; 364/281.3
[58] Field of Search ................. 395/700; 364/DIG. 1, 364/281.3

[56] References Cited

U.S. PATENT DOCUMENTS

| | | |
|---|---|---|
| 4,503,516 | 3/1985 | Agnew et al. |
| 5,081,608 | 1/1992 | Tamura et al. |
| 5,119,491 | 6/1992 | Iwai et al. |
| 5,144,555 | 9/1992 | Takadachi et al. |

*Primary Examiner*—Kevin A. Kriess
*Assistant Examiner*—A. Katbab

*Attorney, Agent, or Firm*—Homer L. Knearl; Saul A. Seinberg

[57] ABSTRACT

The user written application program (UAP) operates interactively with an application program interface (API) to produce multiple formatted documents from multiple data records without user intervention. The UAP calls the API to send set-up parameters to the API, and the API is set-up for formatting based on these parameters received from the UAP. The UAP sends page parameters to the API to establish the page environment at the API based on the page parameters. Then the UAP and the API interactively format the data records as paragraphs, tables or other page elements into a page. The interactive format process checks for errors in the format process at the API. The UAP and the API continue to format data unless a detected error is too severe. The format process is a state driven process. A hierarchy of states in the format process is defined, and the calls to the API set a current active state. Calls to a lower state may elect to override or not override default format parameters with defined parameters in the call.

7 Claims, 20 Drawing Sheets

FIG. 1C

```
CALL AFPINIT USING
        AFPAPI HANDLE (output)
        RETURN CODE
        SEVERITY CODE
    CALL AFPBDOC USING
            AFPAPI HANDLE (input)
            DOCUMENT HANDLE (output)
            ........
            ........
        CALL AFPBPAG USING
                AFPAPI HANDLE (input)
                DOCUMENT HANDLE (input)
                PAGE HANDLE (output)
                ........
                ........
            CALL AFPBPAR USING
                    AFPAPI HANDLE (input)
                    PAGE HANDLE (input)
                    PARAGRAPH HANDLE (output)
                    ........
                    ........
                CALL AFPTXT USING
                        AFPAPI HANDLE (input)
                        PARAGRAPH HANDLE (input)
                        ........
                        ........
                CALL AFPEPAR USING
                        AFPAPI HANDLE (input)
                        PARAGRAPH HANDLE (input)
                        ........
                ........ and so on for a page
            CALL AFPEPAG USING
                    AFPAPI HANDLE (input)
                    PAGE HANDLE (input)
                    ........
                    ........
        CALL AFPEDOC USING
                AFPAPI HANDLE (input)
                DOCUMENT HANDLE (input)
                ........
                ........
    CALL AFPEND USING
            AFPAPI HANDLE (input)
            ........
            ........
```

FIG. 1D

| INITIAL STATE | FUNCTION | RESULTANT STATE |
|---|---|---|
| START STATE | BEGIN DOCUMENT | DOCUMENT STATE |
| | END AFPAPI | FINAL STATE |
| | SET OUTPUT CHARACTERISTICS | START STATE |
| | SET RESOURCE LIBRARY NAMES | START STATE |
| | TERMINATE AFPAPI | FINAL STATE |
| FINAL STATE | INITIALIZE AFPAPI | START STATE |
| DOCUMENT STATE | BEGIN GROUP | DOCUMENT STATE |
| | BEGIN PAGE | PAGE STATE |
| | CREATE AREA | AREA STATE |
| | DEFINE FIELD | DOCUMENT STATE |
| | DEFINE FONT BY ATTRIBUTES | DOCUMENT STATE |
| | DEFINE ROW | DOCUMENT STATE |
| | DESTROY AREA | DOCUMENT STATE |
| | END DOCUMENT | START STATE |
| | END GROUP | DOCUMENT STATE |
| | INVOKE MEDIUM MAP | DOCUMENT STATE |
| | PUT TAG | DOCUMENT STATE |
| | QUERY CURRENT ATTRIBUTES | DOCUMENT STATE |
| | SET COLOR | DOCUMENT STATE |
| | SET FONT | DOCUMENT STATE |
| | SET INTERCHARACTER SPACING | DOCUMENT STATE |
| | SET RULE THICKNESS | DOCUMENT STATE |
| | SET UNITS | DOCUMENT STATE |
| | SET WORD SPACING | DOCUMENT STATE |
| | TERMINATE AFPAPI | FINAL STATE |

FIG. 1E

| INITIAL STATE | FUNCTION | RESULTANT STATE |
|---|---|---|
| PAGE STATE | BEGIN PARAGRAPH | PARAGRAPH STATE |
| | BEGIN TABLE | TABLE STATE |
| | CREATE AREA | AREA STATE |
| | DEFINE FIELD | PAGE STATE |
| | DEFINE FONT BY ATTRIBUTES | PAGE STATE |
| | DEFINE ROW | PAGE STATE |
| | DESTROY AREA | PAGE STATE |
| | END PAGE | DOCUMENT STATE |
| | INCLUDE OBJECT | PAGE STATE |
| | INCLUDE PAGE OVERLAY | PAGE STATE |
| | INCLUDE PAGE SEGMENT | PAGE STATE |
| | PUT AREA | PAGE STATE |
| | PUT BOX | PAGE STATE |
| | PUT CHARACTER STRING | PAGE STATE |
| | PUT RULE | PAGE STATE |
| | PUT TAG | PAGE STATE |
| | QUERY CURRENT ATTRIBUTES | PAGE STATE |
| | QUERY CURRENT POSITION | PAGE STATE |
| | SET COLOR | PAGE STATE |
| | SET FONT | PAGE STATE |
| | SET INTERCHARACTER SPACING | PAGE STATE |
| | SET POSITION | PAGE STATE |
| | SET RULE THICKNESS | PAGE STATE |
| | SET UNITS | PAGE STATE |
| | SET WORD SPACING | PAGE STATE |
| | TERMINATE AFPAPI | FINAL STATE |

FIG. 1F

| INITIAL STATE | FUNCTION | RESULTANT STATE |
|---|---|---|
| AREA STATE | BEGIN PARAGRAPH | PARAGRAPH STATE |
| | BEGIN TABLE | TABLE STATE |
| | DEFINE FIELD | AREA STATE |
| | DEFINE FONT BY ATTRIBUTES | AREA STATE |
| | DEFINE ROW | AREA STATE |
| | END AREA | RETURN TO INVOKING STATE |
| | INCLUDE OBJECT | AREA STATE |
| | INCLUDE PAGE OVERLAY | AREA STATE |
| | INCLUDE PAGE SEGMENT | AREA STATE |
| | PUT AREA | AREA STATE |
| | PUT BOX | AREA STATE |
| | PUT CHARACTER STRING | AREA STATE |
| | PUT RULE | AREA STATE |
| | QUERY CURRENT ATTRIBUTES | AREA STATE |
| | QUERY CURRENT POSITION | AREA STATE |
| | SET COLOR | AREA STATE |
| | SET FONT | AREA STATE |
| | SET INTERCHARACTER SPACING | AREA STATE |
| | SET POSITION | AREA STATE |
| | SET RULE THICKNESS | AREA STATE |
| | SET UNITS | AREA STATE |
| | SET WORD SPACING | AREA STATE |
| | TERMINATE AFPAPI | FINAL STATE |
| PARAGRAPH STATE | END PARAGRAPH | RETURN TO INVOKING STATE |
| | PUT TEXT | PARAGRAPH STATE |
| | SET COLOR | PARAGRAPH STATE |
| | SET FONT | PARAGRAPH STATE |
| | SET INTERCHARACTER SPACING | PARAGRAPH STATE |
| | SET WORD SPACING | PARAGRAPH STATE |
| | TERMINATE AFPAPI | FINAL STATE |

FIG. 1G

| INITIAL STATE | FUNCTION | RESULTANT STATE |
|---|---|---|
| TABLE STATE | BEGIN ROW | ROW STATE |
| | END TABLE | RETURN TO INVOKING STATE |
| | TERMINATE AFPAPI | FINAL STATE |
| ROW STATE | BEGIN FIELD | FIELD STATE |
| | END ROW | TABLE STATE |
| | TERMINATE AFPAPI | FINAL STATE |
| FIELD STATE | END FIELD | ROW STATE |
| | PUT CHARACTER STRING | FIELD STATE |
| | PUT TEXT | FIELD STATE |
| | SET COLOR | FIELD STATE |
| | SET FONT | FIELD STATE |
| | SET INTERCHARACTER SPACING | FIELD STATE |
| | SET WORD SPACING | FIELD STATE |
| | TERMINATE AFPAPI | FINAL STATE |

FORMAT A PARAGRAPH

FORMAT PAGE DATA

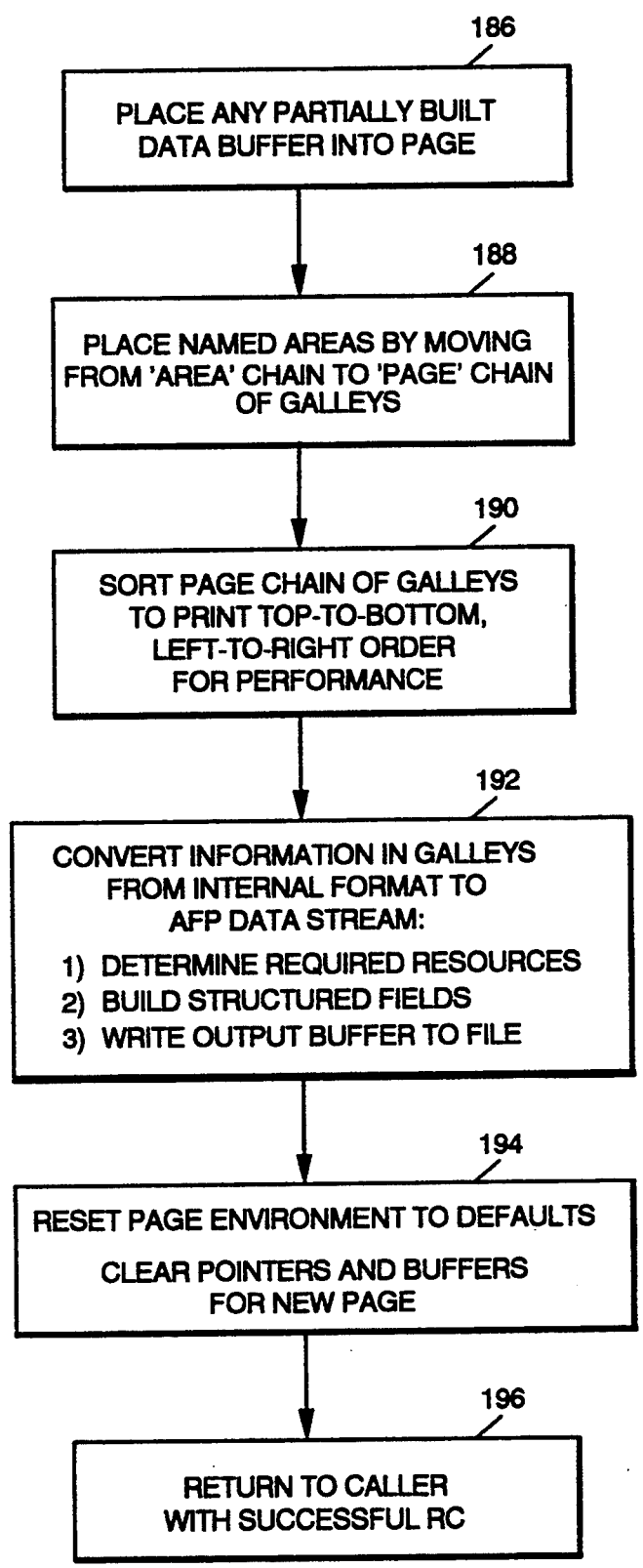

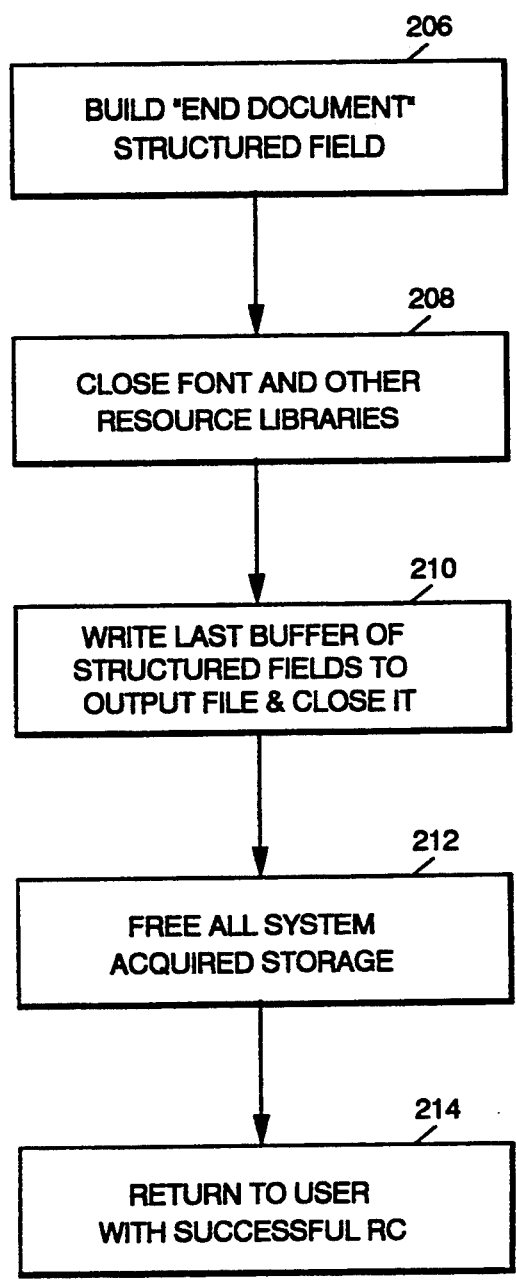

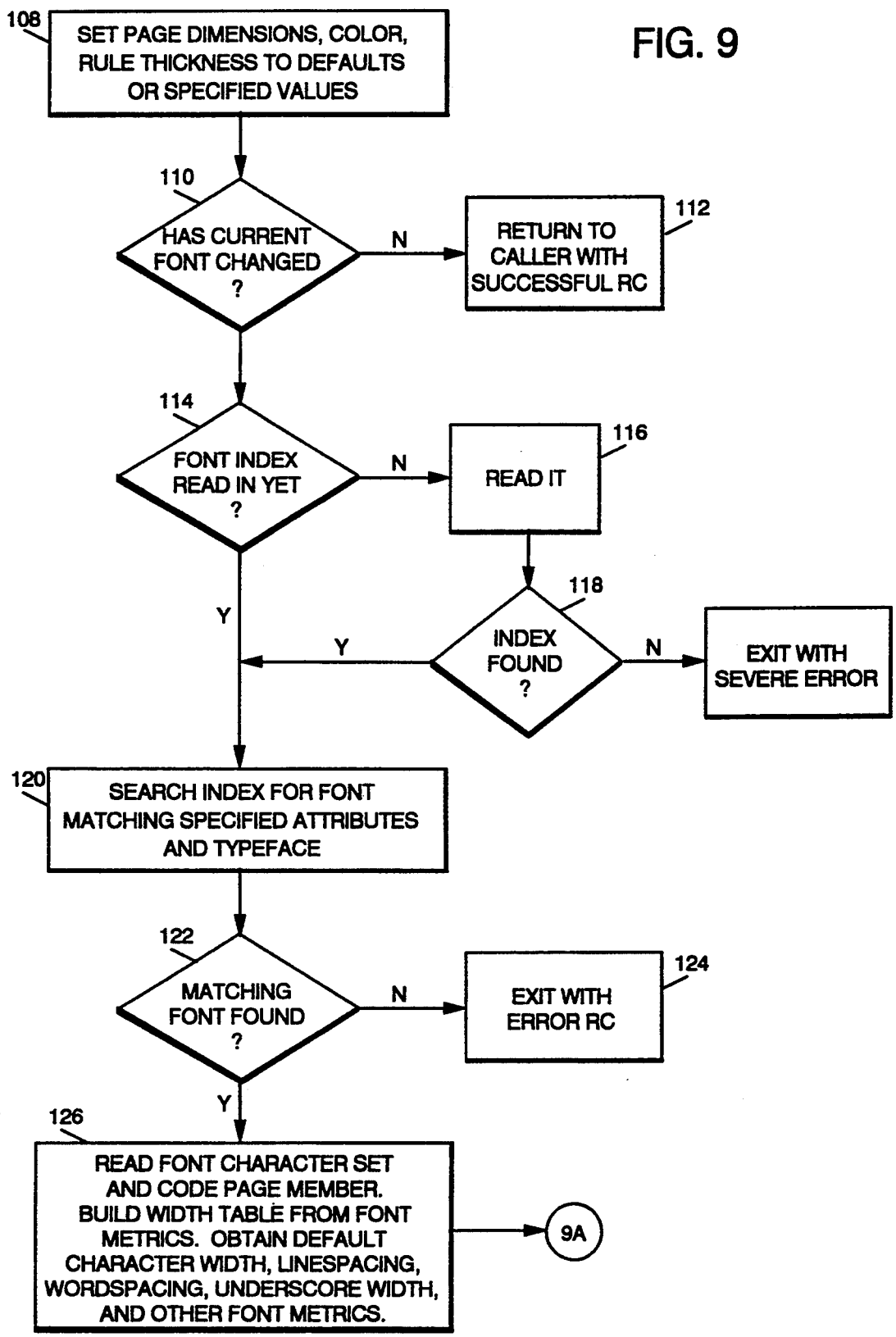

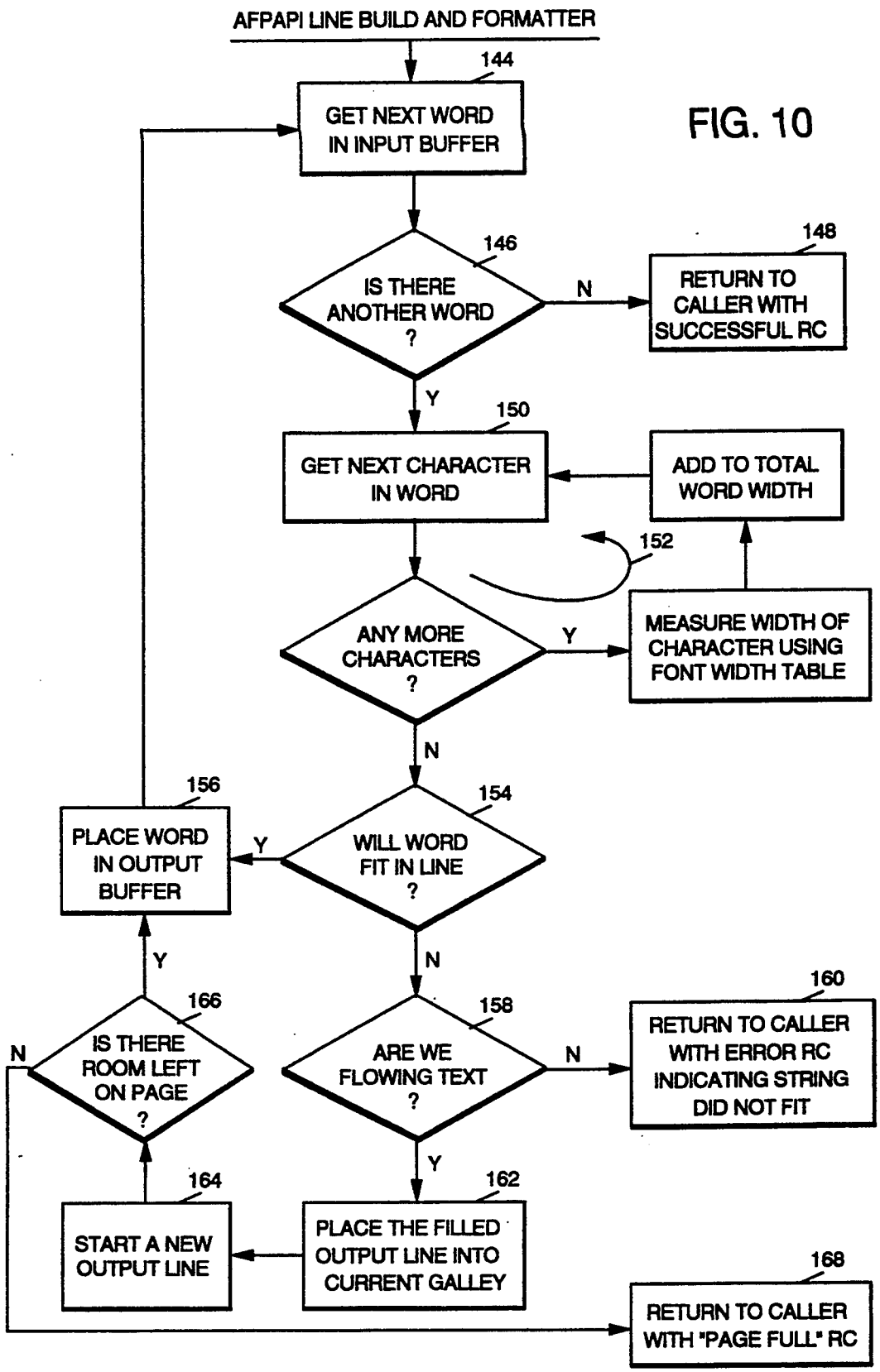

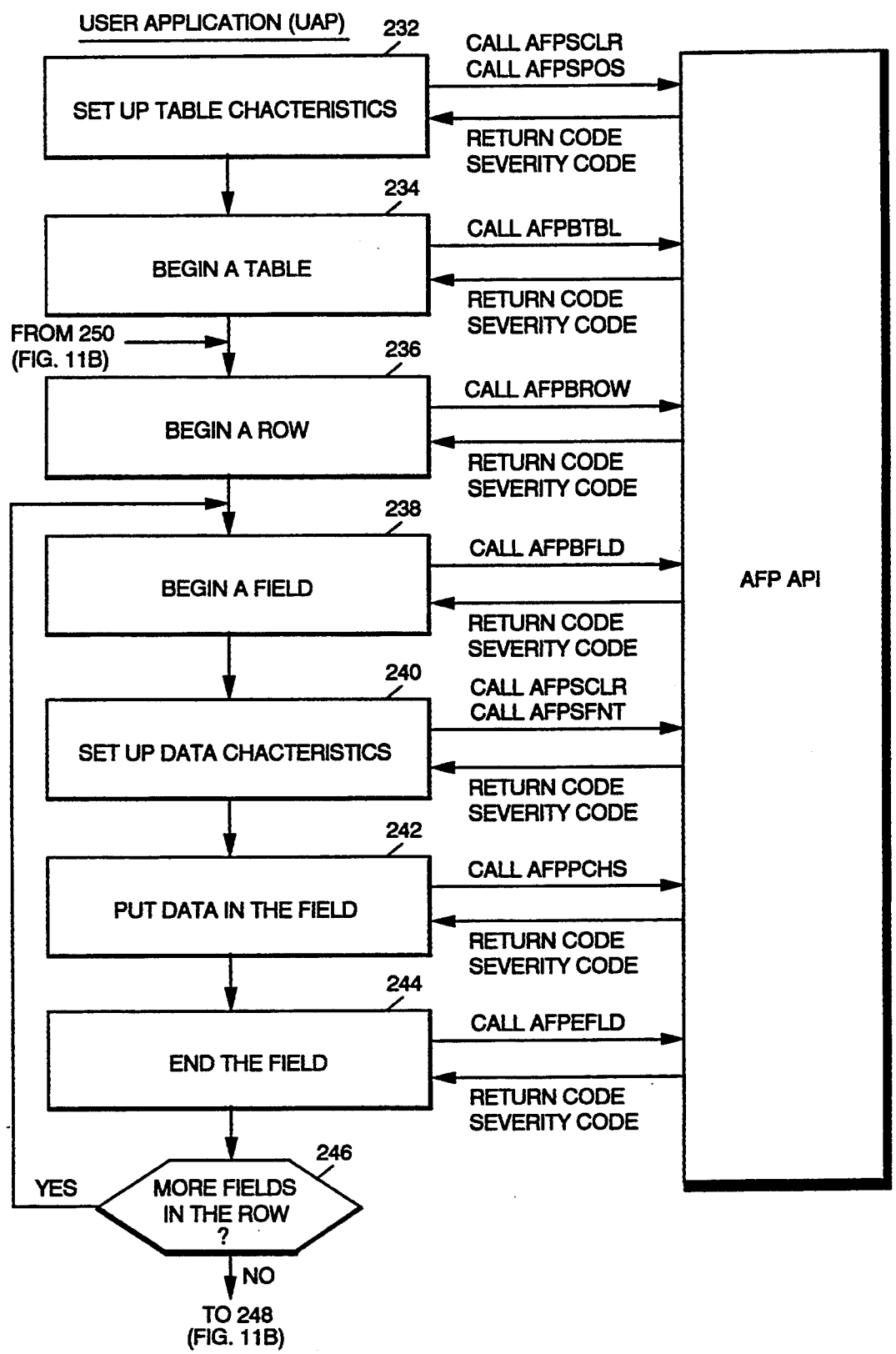

BATCH FORMAT PROCESSING OF RECORD DATA

BACKGROUND OF THE INVENTION

1. Field of the Invention

This invention relates to formatting data records into formatted documents. More particularly, this invention relates to automated word-processing by a user application program in a batch processing environment.

2. Description of the Prior Art

Printing has evolved from slow, fifteenth-century moveable-type, processes to today's high-speed, high-quality, computer driven printers. Now, in addition to lines of text, application programs can print data that includes a variety of output, such as logos, pie charts, graphs, signatures, etc. To date, computer-driven application programs for batch processing of record data into formatted documents have been written in painstaking line of data code. The application programmer had to literally define the position of each dot to be placed in the line to be printed.

Interactive word processing in the personal computer or client/server computing systems has become highly evolved over the last decade. These word processing programs allow a user to create text and embed commands in the text whereby the word processing program subsequently formats the text from the embedded commands. These programs do not batch process data records into formatted documents unless the records contain embedded format commands.

Processing of text with embed format commands to produce formatted documents is well known. One example of such a system is described in U.S. Pat. No. 5,119,491, entitled "Method And Apparatus For Formatting Document By Using Command Codes Regarding Document Structure." Updating stored records with predefined fields is taught in U.S. Pat. No. 5,081,608. Linking formatted forms and the areas within the forms is taught in U.S. Pat. No. 5,144,555, entitled "Method And Apparatus For Supporting Of Making Formatted Document." Finally, the conversion of one record with embedded commands of a first type to another record with embedded commands of a second type is also well known. An example of this conversion process is taught in U.S. Pat. No. 4,503,516, entitled "Methodology For Transforming A First Editable Document Form Prepared By An Interactive Text Processing System To A Second Editable Document Form Usable By An Interactive Or Batch Text Processing System."

None of the prior art techniques solve the problem of batch processing of record data into formatted documents other than by the pains-taking process of an application program processing record data for formatting based on each dot or pel (picture element) in a line of print or display data.

SUMMARY OF THE INVENTION

It is the object of this invention to enhance the ease of use of batch processing of data records, which contain no format commands, into formatted documents.

This object is accomplished in accordance with this invention by the interactive processing of data records by a user application program and an application program interface that performs the format operations. The user application program is analogous to a user creating data with embedded format commands, while the application program interface is analogous to a word processing program that formats the data into documents. In this case, the data is much more than text; it may be objects such as logos, signatures, icons; it may be ruled lines for making geometric shapes. The application program does not create data, but rather is pulling data records from a file. The analogy is meaningful in the sense of the application program interacting with the application program interface to produce a formatted document just as a user interacts with a word processing program to produce a formatted document.

The user written application program (UAP) operates interactively with an application program interface (API) to produce multiple formatted documents from multiple data records without user intervention. The UAP calls the API to send set-up parameters to the API, and the API is set-up for formatting based on these parameters received from the UAP. The UAP sends page parameters to the API to establish the page environment at the API based on the page parameters. Then the UAP and the API interactively format the data records as paragraphs, tables or other page elements into a page.

The interactive process checks for errors in the format process at the API. The API sends return codes with error information and error severity information to the UAP, and the interaction between the UAP and the API continues to format data depending on the severity of the error as indicated by the error severity information.

The format process is a state driven process. A hierarchy of states in the format process is defined, and the calls to the API set a current active state. Default parameters in all states lower in the hierarchy than the current active state are set to the parameters set in the current active state. Calls to a lower state may elect to override or not override default format parameters with defined parameters in the call.

Other objects, advantages and features of the invention will be understood by those of ordinary skill in the art after referring to the complete written description of the preferred embodiments in conjunction with the following drawings.

BRIEF DESCRIPTION OF THE DRAWINGS

FIG. 1C is an example diagram of the use of handles (names) to track the states as the programs interact.

FIGS. 1D, 1E, 1F, 1G are state tables illustrating before and after states when call procedures or functions are performed.

FIG. 7 is the process or logic flow of the AFP API end page process called in FIG. 2.

FIG. 8 is the process or logic flow of the AFP API termination process called in FIG. 2.

FIGS. 9 and 9A are the process or logic flow of the AFP API to establish the formatting environment.

FIG. 10 is the process or logic flow of the AFP API illustrating the building and formatting of a line.

FIGS. 11A and 11b are the process or logic flow of the UAP and AFP API during formatting of a table.

DESCRIPTION OF THE PREFERRED EMBODIMENTS

Figure 1A:
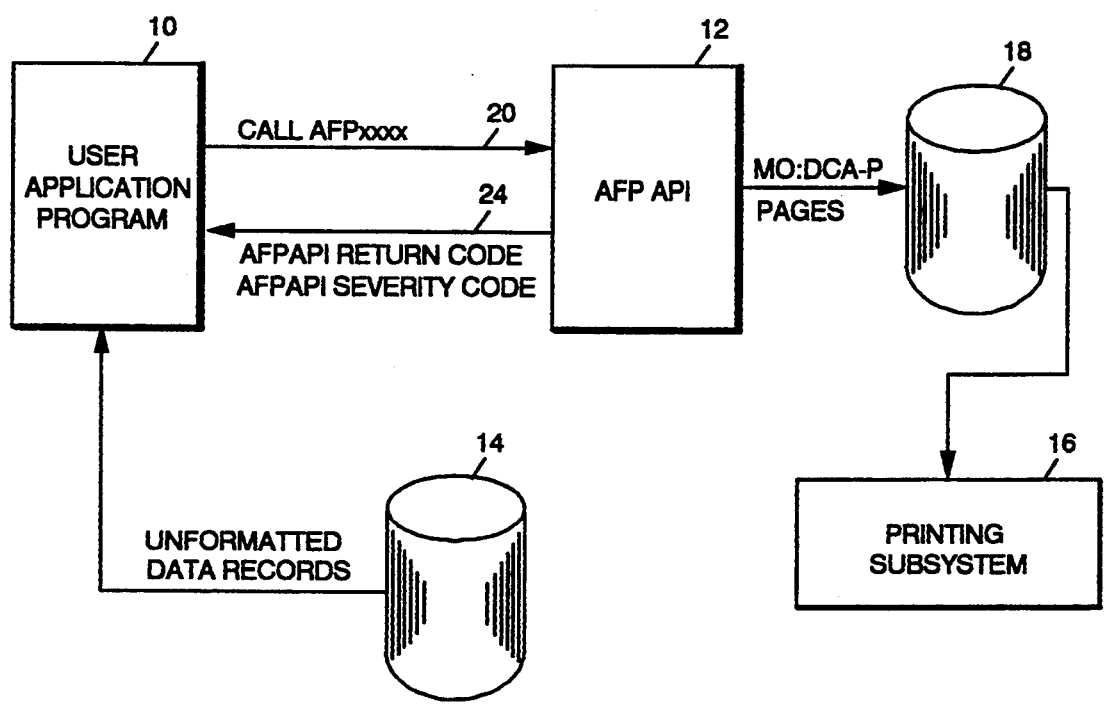
FIG. 1A is a data flow diagram illustrating the interaction between the User Application Program (UAP) and the Application Program Interface (AFP API) to retrieve unformatted data records and create a formatted data stream.

In FIG. 1A, the User Application Program (UAP) 10 interacts with the AFP API program 12 to process the unformatted data records on file 14 to produce formatted pages for printing in printing subsystem 16, or for storage as print files in DASD file 18. User application program or UAP 10 sends program routine calls 20 to the AFP API 12. Each call specifies an AFPxxxx routine to be performed by the AFP API (API hereinafter). The UAP also retrieves unformatted data records from file 14 and forwards them to the API for format processing in accordance with AFPxxxx calls sent to API 12 by UAP 10. API 12 performs the routines called by the UAP 10 and notifies the UAP of the API's state and success/error status by sending back 24 AFP API Return Codes and Severity Codes. In performing the routines called by application program 10, the AFP API produces an AFP data stream of MO:DCA-P pages ready for printing. Once a user has written the application program with the necessary calls to the API to format a generic document, user application program 10 can be executed with the API to produce formatted documents from multiple unformatted data records.

Figure 1B:
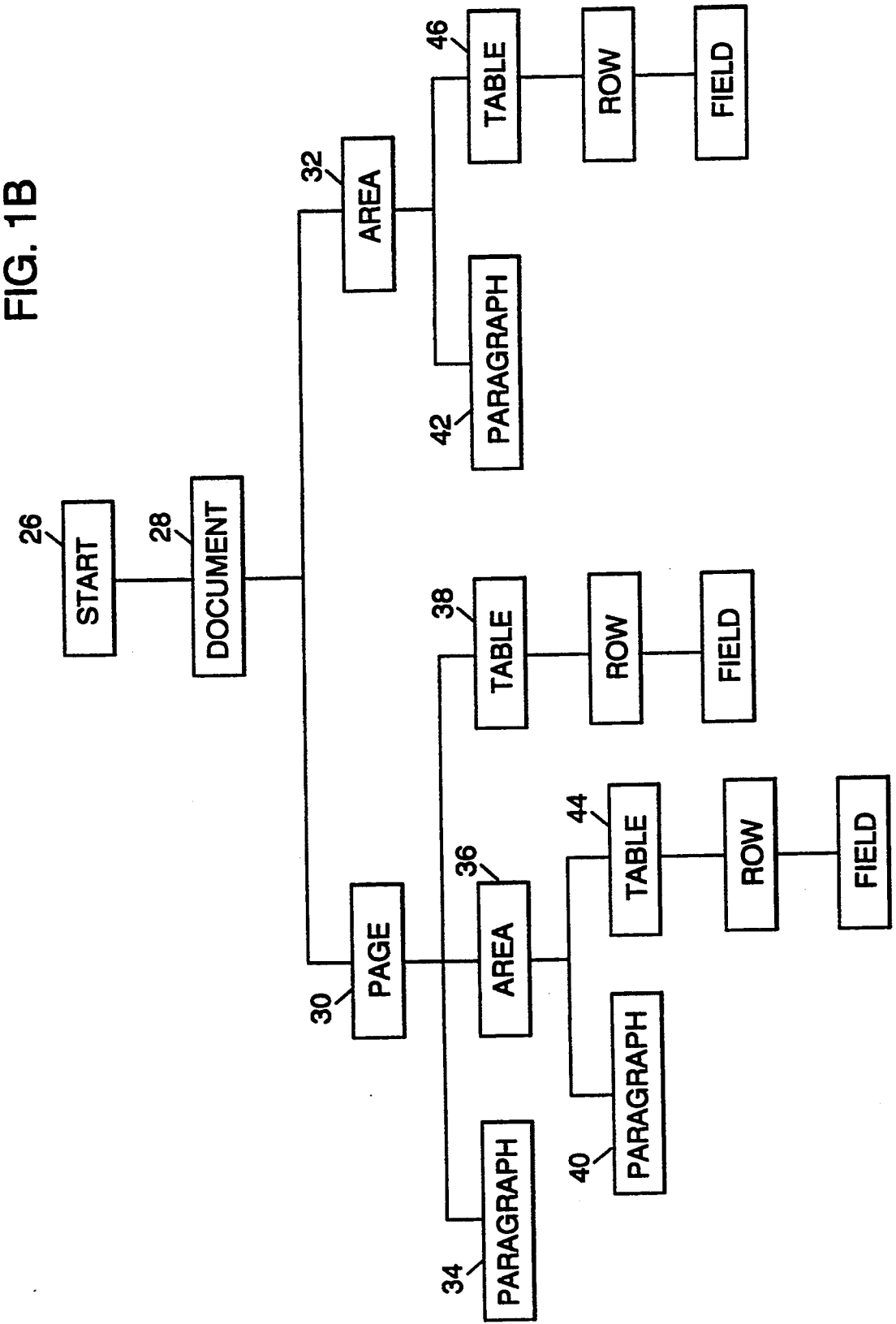
FIG. 1B is a state diagram showing the hierarchy of valid states that occur in the interaction between the UAP and the AFP API.

AFP API is a state driven program. FIG. 1B shows the hierarchy of valid states for the AFP API 12 working with an application program 10. After successful initialization, the AFP API is in Start state 26. The AFP API tracks the state (portion) of a document that it is in so that it knows the attributes to be used in formatting that portion of the document. From Start state 26, the next valid state is Document state 28. Document state 28 may lead to either a Page state 30 or an Area state 32. Pages include as lower level states, Paragraph 34, Area 36 and Table 38. Area state 32 or 36 includes as lower level states Paragraph 40 or 42 and Table 44 or 46. In each Table state, there are successive levels of Row and Field states. Of course, states with the same name in FIG. 1B are the same state; however, the AFP API must track the higher state through which the current state was entered. For example, the AFP API must track that Table state 38 was entered from Page state 30 even though Table state 38 and Table states 46 are one and the same in operation.

To track the path of document process through higher level states, the AFP API attaches "handles" to the calls. A handle identifies the working. FIG. 1C is an example of the use of handles. In the example, the process works down from AFPINIT (Start) through Document state, Page state and Paragraph state and then back up from Paragraph state, to Page state, to Document State to APFEND. The handles are labeled by the arrows in FIG. 1C. When the program ends, a document with the APFEDOC call, AFPAPI returns to Start state 26 (FIG. 1B). An AFP API session is ended with the APFTERM call.

Calls made in a current state set the defaults for lower states. For example, units set in Document state apply to Page and Area states (pages and areas of the same document), and fonts set in Page state apply to an Area state, Table state or Paragraph state under that Page state (page of the document).

Calls made in lower states can override defaults set by a higher state. For example, the call AFPSUNI (set units) in Page state overrides the units set in Document state.

Calls made in lower states that override defaults set by a higher state override lower states as well as the current state. For example, the call AFPSUNI in Table state sets the units for Table, Row and Field states.

FIGS. 1D, 1E, 1F, and 1G are state tables for the valid states shown in FIG. 1B. The initial state column identifies the state the AFP API is in when it receives a call. The function column identifies valid calls for that state. The resultant state column identifies the state the AFP API is in when the call is completed. For example, in Start state, the call Begin Document (AFPBDOC) causes the AFP API to run the Begin Document routine and enter the Document state when successfully completed. Begin Document sets the units, the page dimensions and the orientation of the pages for the document. These attributes are the defaults for the entire document unless overridden in a lower state for a portion of the document. The calls AFPxxxx, as used in the state tables FIGS. 1D–1G, are defined as follows:

AFPBDOC: BEGIN DOCUMENT—begins a document and specifies the default unit of measure, page dimensions, and orientation for a logical page.

AFPBGRP: BEGIN GROUP begins a logical grouping of pages for viewing purposes using AFP Workbench for Windows and for archiving. Related pages can be indexed with the attribute name and attribute value parameters of the AFPPTAG procedure call.

AFPBFLD: BEGIN FIELD begins a field of data in a row of a table.

AFPBPAG: BEGIN PAGE begins a logical page and optionally overrides the page dimensions and orientation specified for the document. The initial current position is at the page origin that is at the top-left corner of the page.

AFPBPAR: BEGIN PARAGRAPH begins a paragraph at the current position using the current values for intercharacter spacing, word spacing, color, and font. The current position at the end of a paragraph is at the bottom left corner of the paragraph.

AFPBROW: BEGIN ROW begins a row in a table.

AFPBTBL: BEGIN TABLE begins a table at the current position. The current position at the end of a table is at the bottom left corner of the table.

AFPCARE: CREATE AREA creates an area in AFP API storage that you can fill with formatted elements for use on one or more pages in the document. To fill the area with elements, include the Area Handle returned from this call on subsequent calls. By doing this, you can set attributes or build and put elements, such as character strings, boxes, rules, paragraphs, tables, resources, and objects.

AFP API places elements relative to the area origin.

You can create and maintain multiple areas concurrently, using the individual area handles to indicate the area in which elements are placed and which area to place on a page. You must issue AFPCARE and AFPEARE procedure calls either within the same page or in document state. You must end an area before placing it on a page. To place the area on a page, use the AFPPARE (Put Area) procedure call. The area and its contents remain in AFP API storage until you delete them using the AFPXARE (Destroy Area) procedure call. As long as an area is in storage, you can place it multiple times. AFPEARE (End Area) ends the formatted area.

For unframed areas, the area origin is at the top-left corner of the area (similar to pages). For framed areas, the Y coordinate of the area origin is at the bottom of the top rule of the area frame (that is, adjusted by the rule thickness of the top rule). The X coordinate of the area origin is unchanged.

AFPDFLD: DEFINE FIELD creates a field definition for a table. Subsequent AFPBFLD (Begin Field) procedure calls use the field definition. You can use either AFPPCCHS (Put Character String) or AFPPTXT (Put Text) procedure calls to put data into the field.

AFPDFNT: DEFINE FONT BY ATTRIBUTES creates a font ID that matches a specified attribute. The font ID is used on subsequent AFPSFNT (Set Font) calls. The font must exist in a font library available to AFP API. See "AFPSLIB."

AFPDROW: DEFINE ROW creates a row definition for use in a table. Associated AFPBROW (Begin Row) calls use this row definition. The AFPBFLD (Begin Field) procedure calls places fields in a row.

AFPEARE: END AREA ends an area that has been created using the AFPCARE (Create Area) procedure call. You cannot place any additional elements in the area after issuing this call. All elements in the area are formatted and placed in AFP API storage for placement with the AFPPARE (Put Area) call. The area remains in storage until you delete it with the AFPXARE (Destroy Area) call.

AFPEDOC: END DOCUMENT ends the document.

AFPEFLD: END FIELD ends the field in a row of a table.

AFPEGRP: END GROUP ends a logical grouping of pages for archiving and viewing purposes.

AFPEND: END AFP API ends the AFP API session and frees all AFP API storage.

AFPEPAG: END PAGE ends the page and causes AFP API to write the page to the designated output file.

AFPEPAR: END PARAGRAPH ends the paragraph and returns the depth of the paragraph, including the depth of the bottom rule if the paragraph is framed, in the current unit of measure. The current position at the end of a paragraph is at the bottom left corner of the paragraph.

AFPEROW: END ROW ends a row in a table. The current position is at the bottom left corner of the row.

AFPETBL: END TABLE ends a table and returns the depth of the table, including the depth of the horizontal rule, in the current units of measure. The current position at the end of a table is at the bottom left corner of the table.

AFPINIT: INITIALIZE AFP API initializes AFP API. You cannot issue any other AFP API procedure call until you have successfully initialized AFP.

AFPINVM: INVOKE MEDIUM MAP selects a medium map from the form definition resource used for printing the AFP API output. A medium map, also called a copy group, is a set of print options that includes names of medium overlays to be printed, which input bin to use, the number of copies, and whether or not to duplex the output.

This call forces printing to begin on a new physical sheet of paper. All pages following this call print with the medium map named, until another AFPINVM call is issued.

AFPIOBJ: INCLUDE OBJECT includes an image or graphics object inline at the current position and specifies the size, rotation, mapping option, and offset of the printed object. The object can be part of a page segment, document, or as an individual object and must reside in the object library identified by the AFPSLIB procedure call or in the AFP API default object library. The current position is unchanged after the AFPIOBJ procedure call.

AFPIOVL: INCLUDE PAGE OVERLAY creates a reference to an overlay at the current position. The current position is unchanged after the AFPIOVL procedure call.

AFPIPSG: INCLUDE PAGE SEGMENT creates a reference to a page segment or brings the page segment inline at the current position. The current position is unchanged after the AFPIPSG procedure call.

AFPPARE: PUT AREA places an area at the current position. You cannot place an area until after you create it with the AFPCARE (Create Area) call and end it with AFPEARE (End Area) call. The current position is unchanged by an AFPPARE procedure call.

AFPPBOX: PUT BOX draws a box with the top left corner beginning at the current position for the specified width and depth, using the current color value and rule thickness for the rules of the box. The top of the box is parallel to the top of the area or page containing the box. The current position is unchanged at the end of this call.

AFPPCHS: PUT CHARACTER STRING places a character string on the page using the current values for intercharacter spacing, word spacing, color, and font. At the end of this call, the current position either is unchanged, or is adjusted in the X (inline) direction as described in the Position Option parameter.

AFPPRUL: PUT RULE draws a rule from the current position extending in the specified X or Y direction using the current color value and rule thickness for the rule. The rule thickness extends below horizontal rules and to the right of vertical rules. At the end of this call, the current position is unchanged.

AFPPTAG: PUT TAG creates an indexing tag in the document for archiving or viewing purposes.

AFPPTXT: PUT TEXT places text in the paragraph or field. Text flows to fit the characteristics of the paragraph or field.

AFPQATT: QUERY CURRENT ATTRIBUTES returns the current values for units, position, color, rule thickness, font, intercharacter spacing, and word spacing.

AFPQPOS: QUERY CURRENT POSITION returns the current position in the current unit of measure.

AFPSCLR: SET COLOR specifies the color for subsequent data (text and rules).

AFPSFNT: SET FONT specifies the font for subsequent text data.

AFPSICS: SET INTERCHARACTER SPACING specifies spacing (in addition to the character increment associated with the character) between the individual characters in a word in the current unit of measure. The space is in the positive "x" (horizontal) direction. AFPSWSP (Set Word Spacing) controls the spacing between words.

AFPSLIB: SET RESOURCE LIBRARY NAMES establishes the names of the print resource libraries used by AFP API.

AFPSOUT: SET OUTPUT CHARACTERISTICS specifies the maximum size of an output record that is written to the file, the output file name, and whether or not to replace an existing file.

AFPSPOS: SET POSITION sets the current position in the current unit of measure.

AFPSRTH: SET RULE THICKNESS specifies the rule thickness for subsequent rules in the current unit of measure. For vertical rules, the rule thickness extends in positive "x" direction. For horizontal rules, the rule thickness extends in the positive Y direction.

AFPSUNI: SET UNITS sets the current units of measure.

AFPSWSP: SET WORD SPACING specifies the width of spaces between words in the current unit of measure.

AFPTERM: TERMINATE AFP API abnormally terminates AFP API and frees all storage. The only AFP API procedure call you can issue after AFPTERM is AFPINIT.

AFPXARE: DESTROY AREA deletes an area and all its contents from AFP API storage.

The user application program 10 is analogous to an actual user, the AFP API 12 is analogous to a word processing program, and the unformatted data is the data being processed by the AFP API 12 under control of the user application program 10. To operate interactively with AFP API 12, user program 10 must have feedback as to the success of processing operations in AFP API 12. Accordingly, in reply to calls from user application 10, AFP API 12 feeds back return codes. The return codes are success/error codes, and contain error information for the user, as well as indicating the severity of the error. There are five levels of error severity for the return codes; they are:

Success: No Error. The called AFP API procedure was successfully completed.

Warning: The called AFP API procedure placed data outside the depth boundary of the page or area. The AFP API can continue.

Error: An error occurred and the called AFP API procedure did not successfully complete. The AFP API can continue.

Severe: An error occurred and the called AFP API procedure did not successfully complete. AFP API program can not continue.

Fatal: An error occurred and the called AFP API did not successfully complete. AFP API can not continue.

The error information in the return code indicates the action that should be taken by the user to modify the application program 10. Return codes at the Warning level indicate that the user application program should start a new page, or adjust the dimensions of the page. Return codes at the Error or Severe level indicate an error in the user application program. The user may ignore errors at the Error level, and AFP API will still run. However, the UAP may not produce the desired results for the formatted document. Errors in the user program 10 at the Severe level must be fixed before the AFP API will run the application program. Errors at the fatal level indicate an error in AFP API, and these errors must be fixed for the AFP API to run.

OPERATION OF PREFERRED EMBODIMENT

Figure 2:
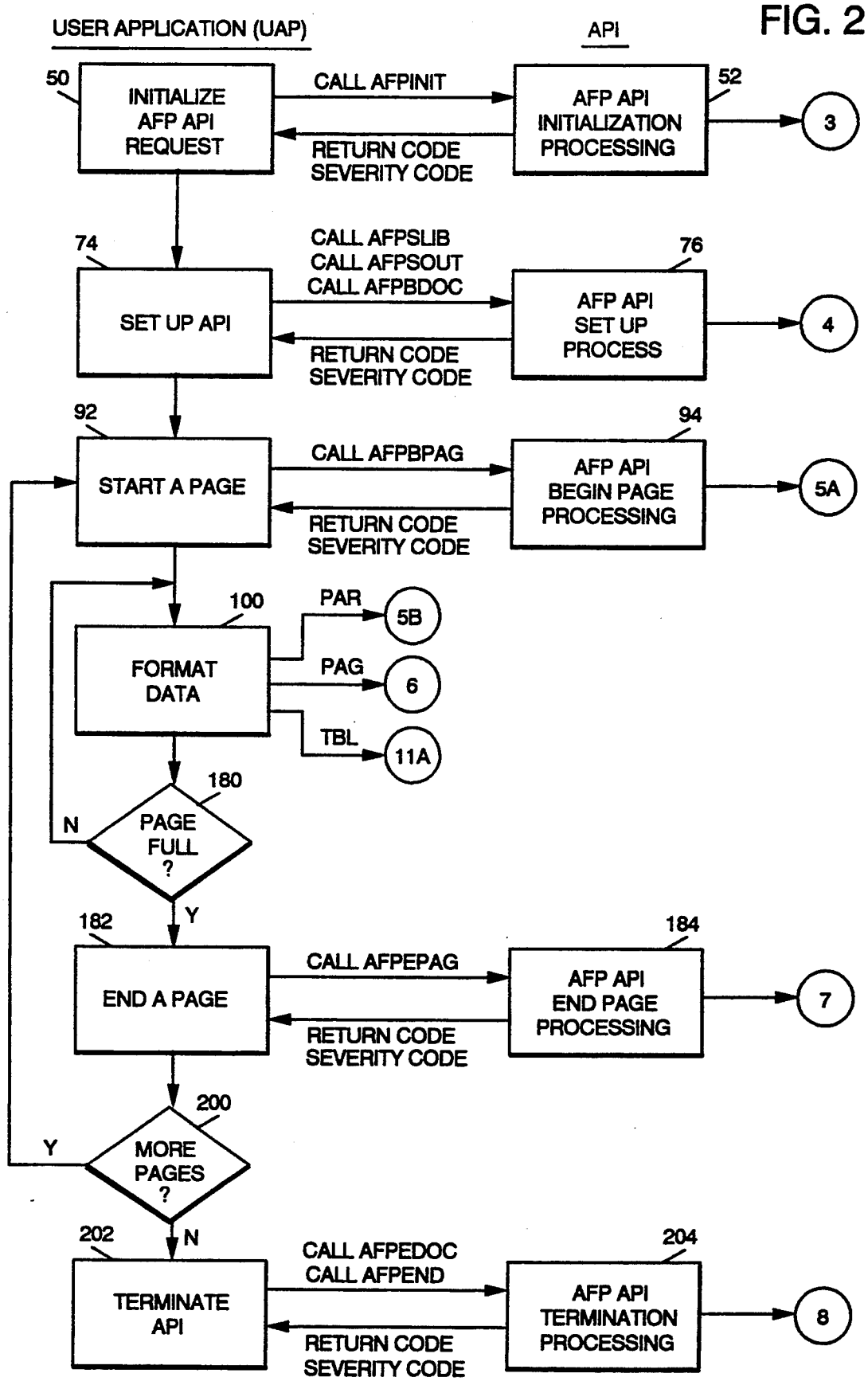
FIG. 2 is the process or logic flow of the preferred embodiment of the invention.

In FIG. 2, the interactive operation between the user application program 10 (FIG. 1A) and the AFP API 12 (FIG. 1A) is illustrated. The User Application Program (UAP) procedures or operations are shown on the left, and the API procedures or operations are shown on the right. Operation 50 in the UAP initializes the API by sending the AFPINIT call. This call puts the API into the Start state. Initialization procedure 52 in the API is shown in detail in FIG. 3.

Figure 3:
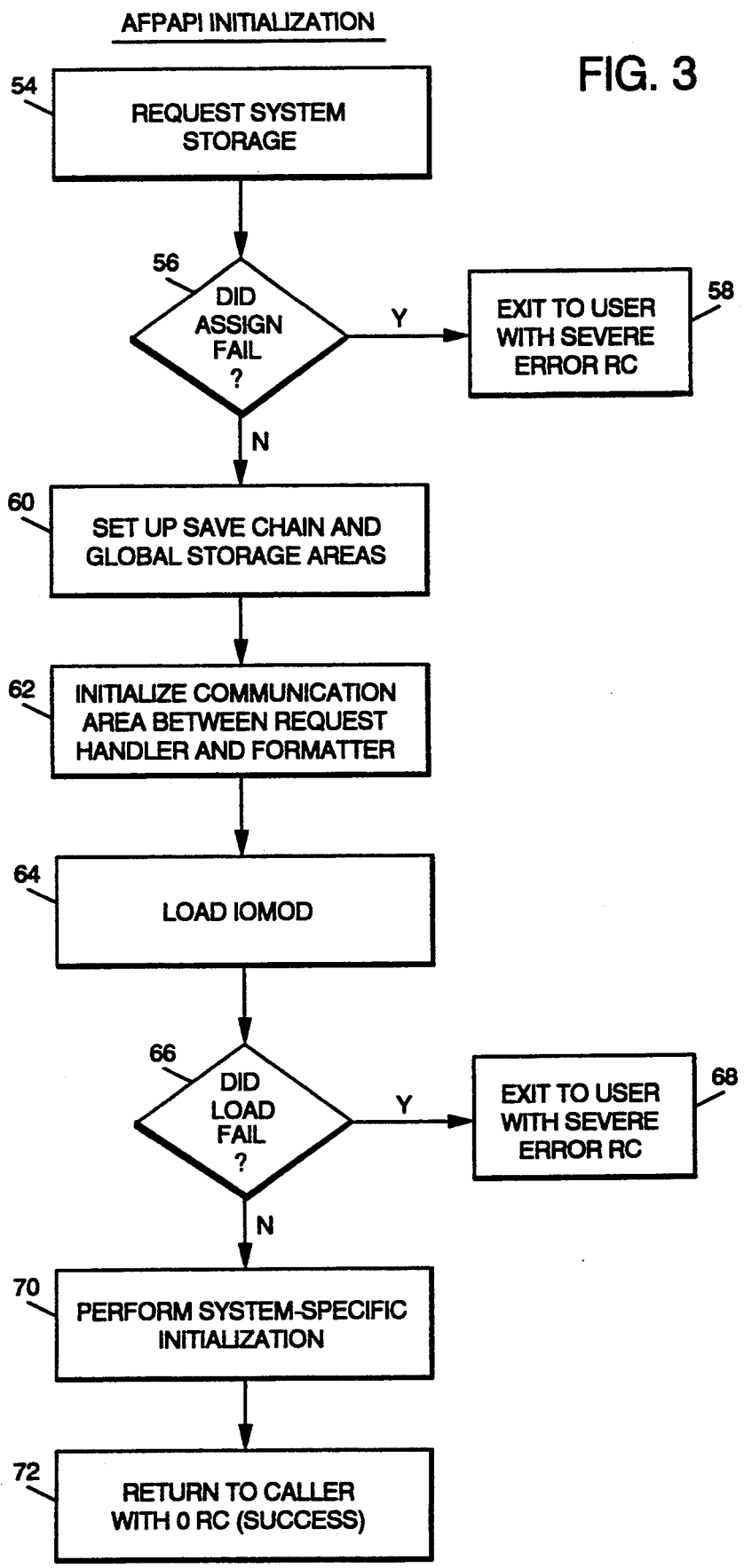
FIG. 3 is the process or logic flow of the AFP API initialization process called in FIG. 2.

AFP API initialization in FIG. 3 begins at operation 54 where system storage is requested. Decision 56 tests whether the assignment of storage was successful. If the assignment failed, decision 56 branches yes to operation 58. Operation 58 is an example of a return code being sent back to the UAP where the error level of the return code is Severe. If the storage assignment did not fail, the initialization procedure branches to operation 60.

In operation 60, the system sets up the save chain and global storage areas. The save chains and global storage are used in the processing of calls. Operation 62 follows and initializes the communication storage area used by the request handler and the formatting operations of the program. The communication area is used to track the states of the API program 12 (FIG. 1A).

In operation 64, the load IOMOD loads the input/output service of the API program in system memory at addresses below 16 megabytes. This is used in 24-bit addressing. Decision 66 tests whether the load operation 64 was successful. If the load failed, decision branch 66 branches Yes to operation 68. As in operation 58 discussed above, operation 68 sends a return code with a severe error code back to the UAP. Failure testing would be embedded throughout the UAP to monitor most API operations.

Operation 70 performs any system specific initializations which vary according to the system running the API. After operation 70, the initialization of the API is complete. Operation 72 sends back the Success return code to the UAP (see FIG. 2).

In FIG. 2, the User Application Program (UAP), at operation 50, receives the Success return code and proceeds to operation 74. In operation 74, the UAP sets the output defaults for the API. Operation 74 uses the following calls to set up the API—AFPSLIB (set resource library names), AFPSOUT (set output characteristics) and AFPBDOC (begin document). Operation 76 in the API is the AFP API set up process and is detailed in FIG. 4.

Figure 4:
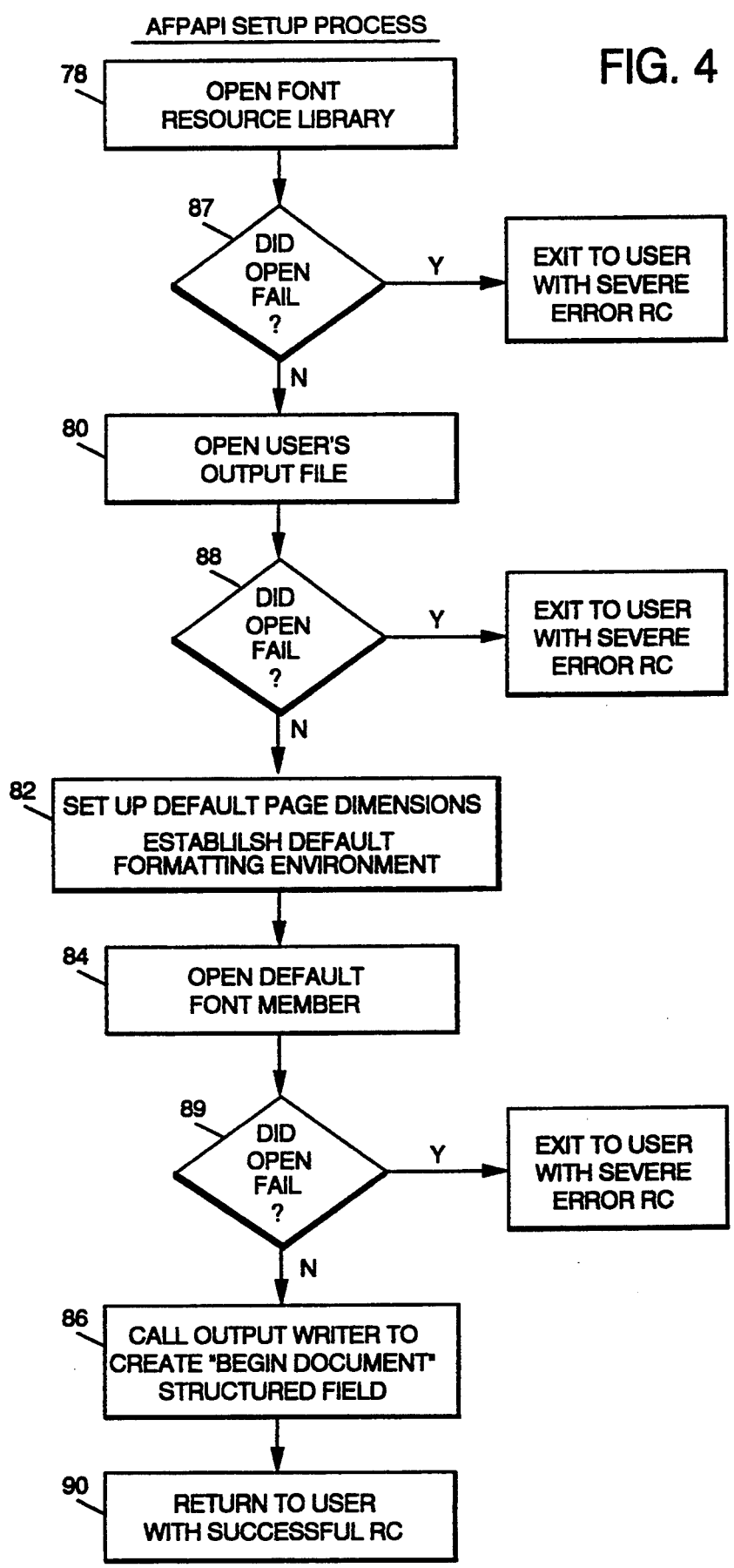
FIG. 4 is the process or logic flow of the AFP API set up process called in FIG. 2.

In FIG. 4, the API set up process begins at operation 78 by opening the font resource library. The parameters in the AFPSLIB call specify the libraries to be opened. Other libraries include object and page segment libraries. With the font library successfully opened, operation 80 opens the user's output file. This defines, or names, the file to be used in DASD 18 for the formatted pages; the definition of the output file includes the output characteristics as passed by the AFPSOUT call. After the output file is successfully opened, operation 82 sets up document defaults, such as page dimensions and other format parameters. The format parameters are passed to the API in AFPBDOC call. Operation 84 then opens the default font member from the font library, and if all open operations are successful, operation 86 calls the output writer subroutine in the API to create the structured field defined in accordance with the defaults set by the begin document call, AFPBDOC.

Throughout the setup process in FIG. 4, the open processes are tested at decisions 87, 88 and 89. If any of the open processes fail, the setup process sends a Return Code to the UAP with the error information and the Severity Code. If the setup process is successfully completed, operation 90 sends the Success return code to operation 74 in FIG. 2.

Figure 5A:
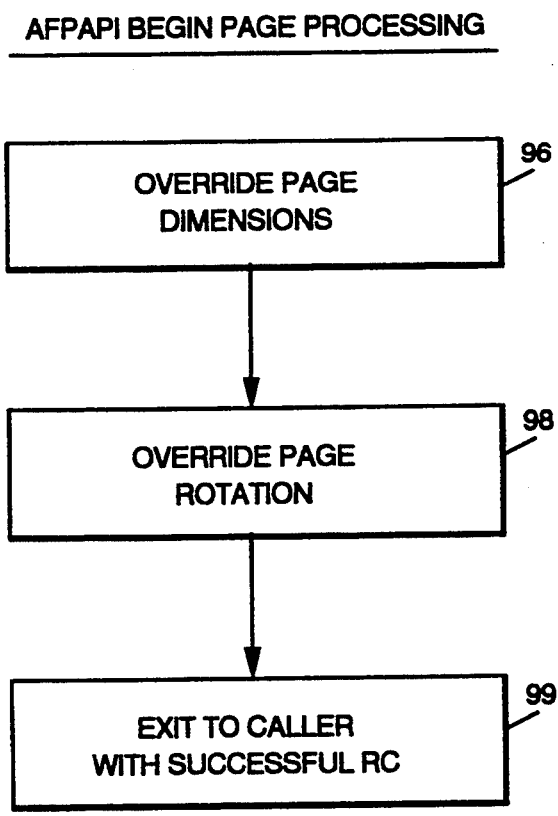
FIG. 5A is the process or logic flow of the AFP API begin page process called in FIG. 2.

After the API setup is successful, operation 92 generates the AFPBPAG call for the begin page processing operation 94. Parameters in AFPBPAG are used to override the defaults set with begin document call. An example of begin page processing is detailed in FIG. 5A. Operation 96 overrides the page dimension default, and operation 98 overrides the page rotation default. If the override operations are successfully completed, operation 99 sends back Success return code to start a page operation 92 in FIG. 2.

Figure 5B:
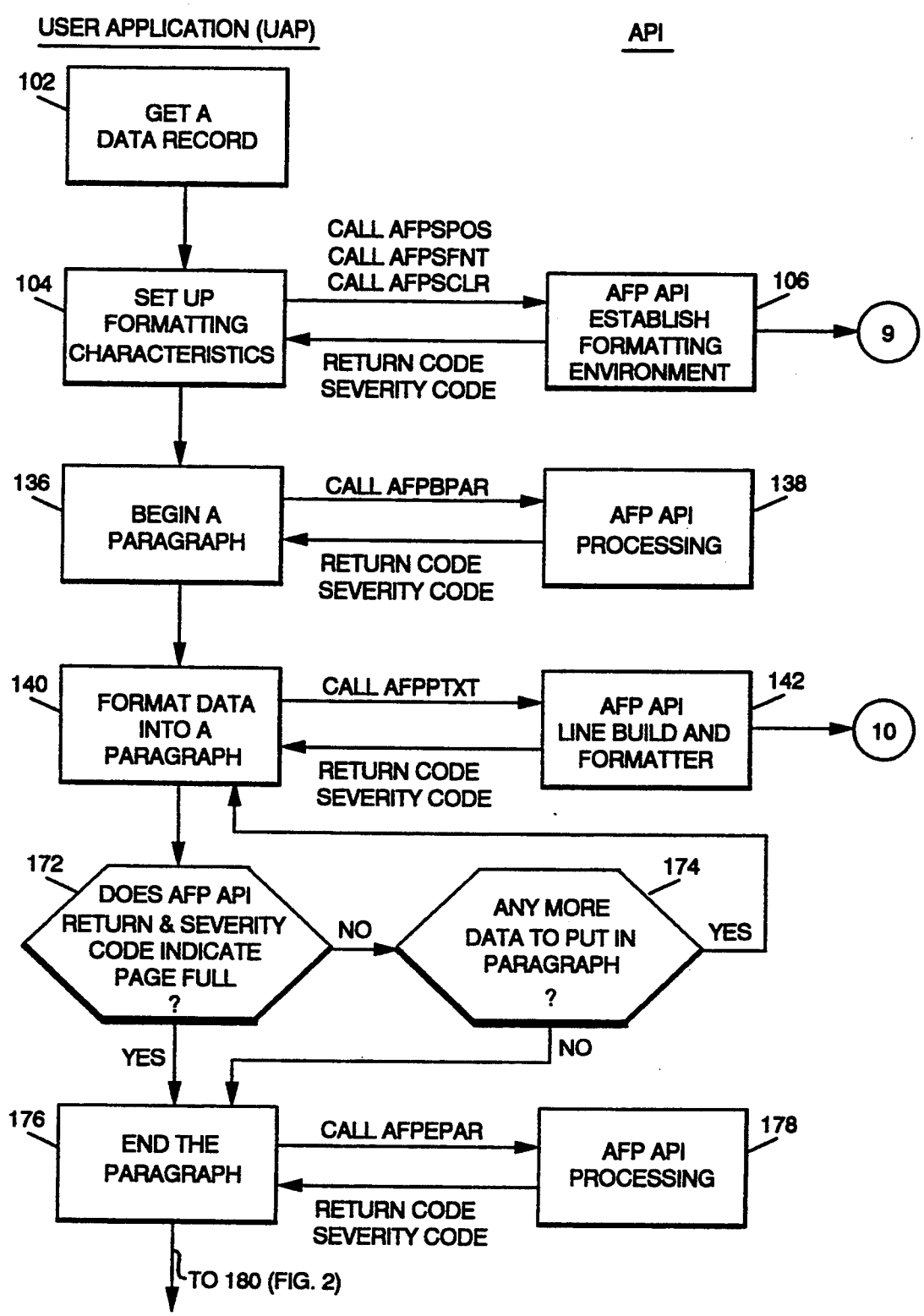
FIG. 5B is the process or logic flow of the UAP and AFP API interaction during formatting of a paragraph.
Figure 6:
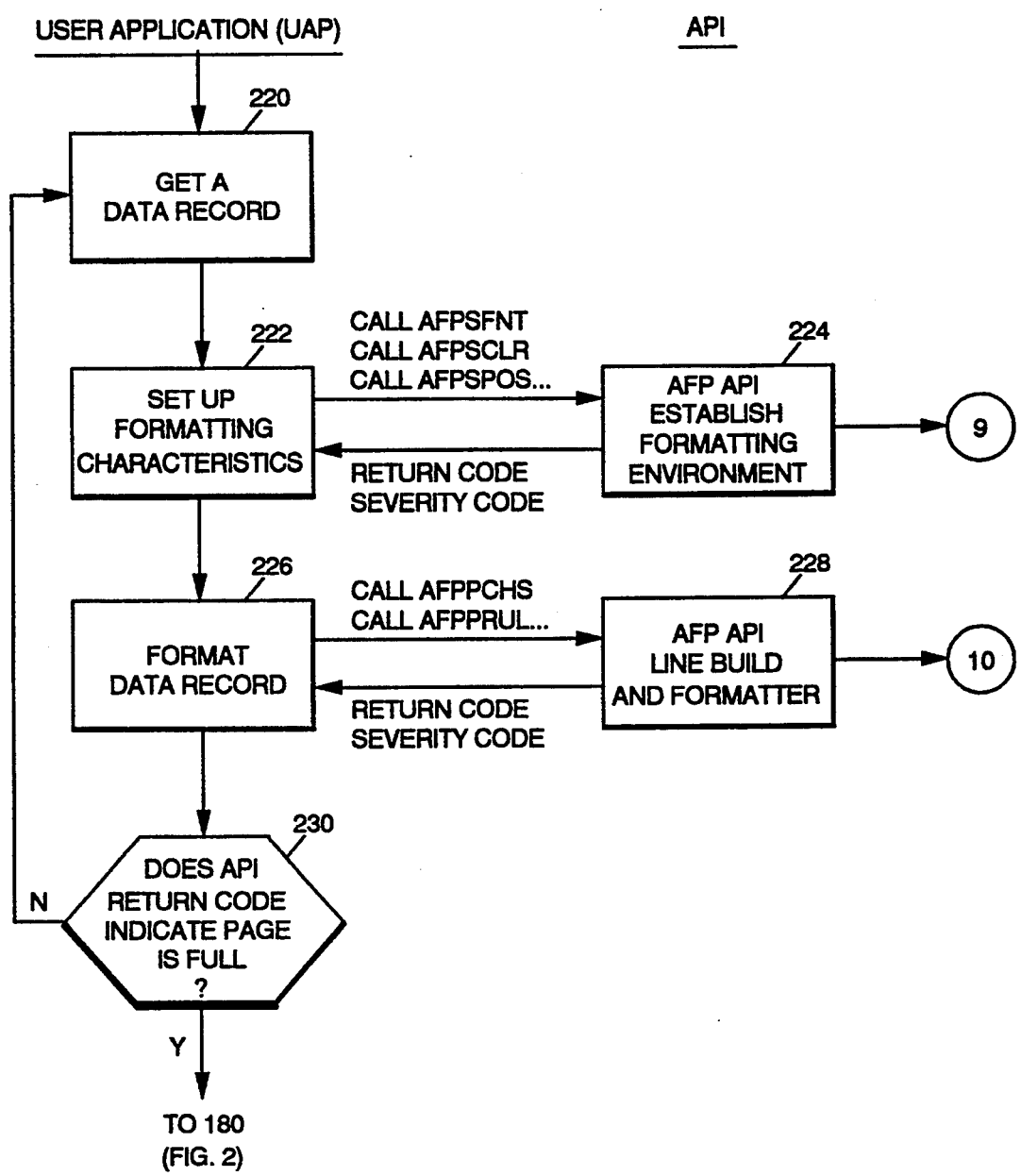
FIG. 6 is the process or logic flow of the UAP and AFP API interaction during formatting elements other than paragraphs and tables for a page.

In the UAP, program control passes to format data 100. Operation 100 is detailed in FIGS. 5B, 6 or 11A and involves interactive operation between the UAP and API. In FIG. 5B, the interactive operation formats a paragraph. In FIGS. 6 and 11A, the UAP interacts with the API to format a page and a table, respectively. As shown FIG. 1B, operation 100 in FIG. 2 could be an operation to format a paragraph, an area or a table as part of a page, or it could be simply formatting a page. Paragraph formatting operation is shown in detail in FIG. 5B.

In FIG. 5B, operation 102 in the UAP gets the unformatted data record from DASD 14 (FIG. 1A). Operation 104 sets the formatting characteristics by sending calls, AFPSPOS, AFPSFNT, AFPSCLR, to the API. AFPSPOS sets the position in this case for start of paragraph. AFPSFNT sets the font for subsequently following text; otherwise, default font set at higher state level is used. AFPSCLR sets the color for subsequent data, text or rules (drawn lines). These calls are received and executed by operation 106 at the API which establishes the operating environment for the formatting process. Operation 106 is detailed in FIG. 9.

Establish environment process starts at operation 108 in FIG. 9 which sets page dimensions, color and rule thickness to the defaults or the parameters passed by the calls. Decision 110 then checks for a font change. If there was no font change, the format environment is established by operation 108, and a Success return code is sent back by operation 112. The Success return code goes back to operation 104, set up format, in FIG. 5B, and indicates format environment is ready. The rest of FIG. 9 illustrates a detail example of a font change.

Figure 9A:
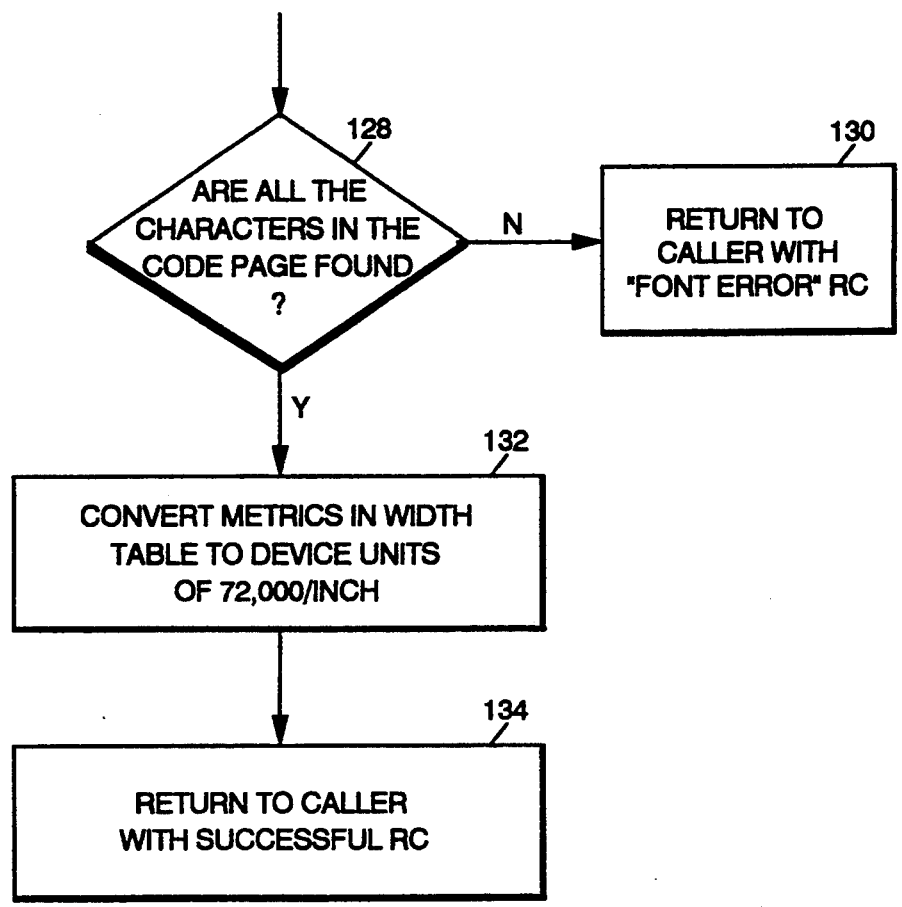

Decision 114 in FIG. 9 tests whether the index to the font library has been read. If not, the index is read at operation 116, and checked for successful operation by decision 118. After the index is successfully read, operation 120 searches the index for the font matching the attributes called for by the parameters in AFPSFNT. If no match is found, decision 122 branches to operation 124 that sends a return code with a severity code that equals Error. If a match is found, operation 126 reads the font characteristics and character set from the font library resource. Decision 128 in FIG. 9A checks that the font character set and its parameters were found. If not found, operation 130 sends back a font error return code with a Severity code that equals Error. If the font character set is found, operation 132 converts the metrics in the font to the internal units, and operation 134 returns a Success code back to operation 104 in FIG. 5B.

Program control in the UAP now passes to operation 136 which is begin a paragraph. Operation 136 sends call AFPBPAR to operation 138 in the API. AFPBPAR starts the paragraph at the current position set above by AFPSPOS, and in accordance with the environment defined by operation 106. When a Success return code indicates start of paragraph is complete, the UAP program starts operation 140. In operation 140, call AFPPTXT passes text in the unformatted record from DASD 14 (FIG. 1A) to operation 142 in the API. Operation 142 builds a line of text and is shown in detail in FIG. 10.

Operation 144 in FIG. 10 gets the next word in input buffer, and decision 146 checks to see if there was another word in the input buffer. If there is none, line build is complete, and operation 148 sends back a Success code to operation 140 (FIG. 5B). If there is a word in the input buffer, operation 150 gets the next character in the word. Loop 152 builds the word by measuring each character's width, and adding it to the word width. When the word is complete, decision 154 tests whether the word will fit on the line. If the word fits, operation 156 places the word in the output buffer.

If the word does not fit on the line, decision 158 checks whether the UAP called for the text to be flowed to the next line. If text is not being flowed, operation 160 sends back a error information return code with a Warning severity code. If text is being flowed, operation 162 places a filled output line in current galley storage; current galley storage indicates the line is ready to be printed. Operation 164 starts a new output line, and decision 166 tests whether there is room on the page for the new line. If there is room left on the page, the word is placed in output buffer, and operation 144 gets the next word. If there is no room left on the page, a page full error return code with severity Warning code is returned by operation 168 to format data operation 140 in FIG. 5B. The text that did not fit is placed in the output buffer.

In FIG. 5B, decision 172 checks for page full. If the page is not full, decision 174 tests whether there is more data for the paragraph. If there is more data, program control returns to operation 140. Operation 140 gets more data for the paragraph, and operation 142 in the API builds the lines in the paragraph until data again runs out or page is full. If the page is full, operation 176 ends the paragraph by sending the AFPEPAR call to the API. The AFPEPAR contains returns the depth of the paragraph in current unit of measure to the UAP. The API in operation 178 places the contents of the paragraph into the current galley.

Operation 178, when successfully completed, sends a Success return code back to operation 176, and the UAP program flows to decision 180 in FIG. 2.

Decision 180 tests for page full. If the page is full, operation 182 in FIG. 2 calls AFPEPAG to end page processing 184 in the API. End page processing is shown in detail in FIG. 7, and begins at operation 186 by placing partially built data buffers into the page. Areas are placed by operation 188 in the page by moving them from "Area" save chain storage to the "Page" save chain storage for galleys. Finally, the page chain of galleys is sorted from top-to-bottom and left-to-right by operation 190.

The formatted print information in the galleys is now ready for conversion to the AFP data stream, MO:DCA-P. Operation 192 performs this conversion by finding necessary resources for the presentation, building the structured fields for the AFP data stream and writing the output buffer to file in DASD 18 (FIG. 1A). The structured fields include for example, the environment group, the presentation text, included resources, and end page. Operation 194 then resets the page environment to the defaults, and clears pointers and buffers for the new page. If the operations in FIG. 7 are successfully completed, a success return code is sent by operation 196 back to end page operation 182 (FIG. 2) in the UAP.

In FIG. 2, decision 200 then tests for more pages in the document. If there are no more pages, terminate API operation 202 sends calls, AFPEDOC (end document) and AFPEND (end AFP API) to API termination processing 204. API termination is shown in detail in FIG. 8, and begins with operation 206. Operation 206 builds the End Document structured field for the AFP data stream. Operation 208 closes the resource libraries, including the font resource library, and operation 210 writes the structured field (likely end document) in the last buffer to the output file and closes the file. Finally, operation 212 frees up all of the system storage acquired by the API session, and operation 124 sends the return code with success severity code back to terminate API operation 202. The UAP and API interaction is now closed until the UAP initiates another API session.

In the format data operation 100 of FIG. 2, other interactive processes between the UAP and the API are possible, as described above. For example, if the UAP is written to build other elements for a page rather than paragraphs or tables, the interactive operation is illustrated in FIG. 6. Building elements on a page begins at operation 220 which gets the unformatted data record from DASD 14 (FIG. 1A). Operation 222 sets the formatting characteristics by sending calls, AFPSPOS, AFPSFNT, AFPSCLR, to the API. AFPSPOS sets the position, in this case, for start of page elements. AFPSFNT sets the font for subsequently following text; otherwise, default font set at higher state level is used. AFPSCLR sets the color for subsequent data, text or rules (drawn lines). These calls are received and executed by operation 224 at the API which establishes the operating environment for the formatting process. Operation 224 is detailed in FIG. 9 described previously during formatting of a paragraph.

When the establish environment operation 224 returns a Success code back to operation 222 in FIG. 6, program control in the UAP passes to operation 226.

Format data record operation 226 sends calls AFPPCHS and AFPPRUL, as appropriate, to the line build operation 228 in the API. AFPPCHS may be used to place a character string on the page, while AFPPRUL may be used to draw a line on the page. An example of operation 228 building a line of text is shown in detail in FIG. 10, as described earlier. When the line build operation is successfully completed, the return code with success severity code is sent back to operation 226 in the UAP. Decision 230 in the UAP tests whether return code from operation 228 indicates page is full. If the page is full, UAP proceeds to decision 180 in FIG. 2 and operates as described earlier.

Another format data example for interactive operation 100 in FIG. 2 is format a table. This interactive operation is detailed in FIGS. 11A and 11B. Formatting a table begins with operation 232 sending calls AFPSCLR and AFPSPOS to the API to set the color and current position for the table. When the API indicates success at setting table characteristics and position, UAP operation sends the begin table call, AFPBTBL. This call starts the table at the current position. As long as the format a table UAP call procedures are completed successfully, as indicated by return codes, the UAP proceeds as shown in FIGS. 11A and 11B.

Operation 236 calls the API to begin a row in the table. Operation 238 calls for beginning a field in the row. Operation 240 sets up data characteristics, such as font and color, and operation 242 then puts the data in the field. The call AFPPCHS sends the character string to the API for incorporation in the field in the row. Operation 244 closes the field format processing, and decision 246 tests for more fields in the row. If there are more fields, UAP program control returns to operation 238, begin a field.

Figure 11B:
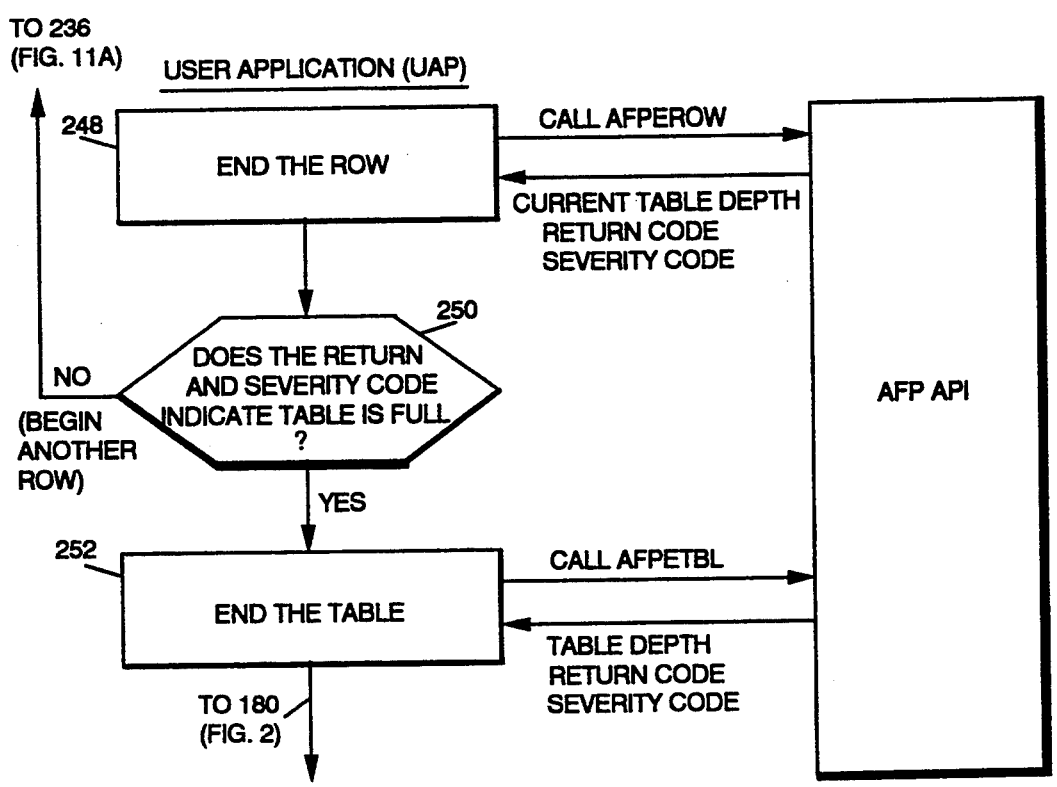

If there are no more fields, the UAP program control passes to end-the-row operation 248 in FIG. 11B. Operation 248 calls the API with AFPEROW, and the API closes the row. When successful return code from the API indicates the row has been ended, decision 250 in the UAP checks whether the return code from the API indicated that the table was full. If the table is not full, the UAP returns to operation 236 to begin another row. If the table is full, operation 252 in the UAP ends the table by sending call AFPETBL to the API. The API then closes out the table, and sends back the table depth information and the return code to operation 252. The API operations in format a table have not been detailed, as they are similar in operation to API procedures previously described for format a paragraph and format a page. When format a table has been successfully completed, UAP returns program control to FIG. 2 where decision 180 tests for page full.

While a number of preferred embodiments of the invention have been shown and described, it will be appreciated by one skilled in the art that many variations on the operations described in FIGS. 2–11 may be made by writing the UAP to batch format different types of documents.

What is claimed is:

1. In a batch processing printing system, a method for producing a formatted page in a document from data records having no required format commands embedded therein, said system having a user written application program (UAP) that operates interactively with an application program interface (API) without user intervention, said method comprising the computer implemented steps of:

(a) calling the API from the UAP and sending set-up parameters to the API;

(b) setting up default parameters in the API in accordance with the set-up parameters received from the UAP;

(c) calling the API from the UAP and sending page or page element parameters to the API;

(d) establishing a page or page element environment based on the default parameters and the page or page element parameters received from the UAP; and (e) and interactively between the UAP and the API formatting the data records in accordance with the default parameters and the page or page element parameters into paragraphs, tables or other page elements to produce a formatted page.

2. The method of claim 1 further comprising the computer implemented steps of:

(f) calling from the UAP the API with an end of page command if a page has been formatted;

(g) in response to the end of page command converting the formatted page into a printer data stream.

3. The method of claim 2 further comprising the Computer implemented steps of:

(h) checking for more pages to be formatted; and (i) repeating steps (c) through (h) if more pages are to be formatted;

(j) calling the API from the UAP with an end document processing command if all pages have been formatted;

(k) in response to the end document processing command terminating document processing at the API.

4. The method of claim 3 further comprising the computer implemented steps of:

detecting errors in steps (b), (d), (e), (g) and (k) and returning codes with error information and error severity information to the UAP; and continuing the interaction between the UAP and the API depending on the severity of the error as indicated by the error severity information.

5. The method of claim 1 further comprising the computer implemented steps of:

detecting errors in said formatting step and returning codes with error information and error severity information to the UAP; and continuing said formatting step depending on the severity of the error as indicated by the error severity information.

6. The method of claim 1 wherein said formatting step is a format process comprising a series of steps in a state driven process having a hierarchy of states and the method further comprises the steps of:

step (a) defining default parameters for a current active state;

step (b) sets the default parameters defined by step (a) in the current active state and all states lower in the hierarchy than, and dependent upon, the current active state;

step (c) calls states in the API and defines page or page element parameters for a called state and all states lower in the hierarchy than, and dependent upon, the called state; and overriding the default parameters in called states with the page or page element parameters from step (c).

7. The method of claim 6 further comprising the computer implemented steps of:

detecting errors in the format process at each state and defining the severity of the error;

continuing the format process depending on the severity of the error.

* * * * *